United States Patent
Morreale et al.

(10) Patent No.: US 9,644,541 B2
(45) Date of Patent: May 9, 2017

(54) TURBINE ENGINE COMPRISING A FLOATING BEARING FOR GUIDING A SHAFT OF THE TURBINE ENGINE

(75) Inventors: Serge Rene Morreale, Guignes (FR); Laurent Gille, Dammarie les Lys (FR)

(73) Assignee: SNECMA, Paris (FR)

( * ) Notice: Subject to any disclaimer, the term of this patent is extended or adjusted under 35 U.S.C. 154(b) by 645 days.

(21) Appl. No.: 14/124,135

(22) PCT Filed: Jun. 6, 2012

(86) PCT No.: PCT/FR2012/051261
§ 371 (c)(1),
(2), (4) Date: Dec. 5, 2013

(87) PCT Pub. No.: WO2012/168649
PCT Pub. Date: Dec. 13, 2012

(65) Prior Publication Data
US 2014/0126992 A1    May 8, 2014

(30) Foreign Application Priority Data

Jun. 8, 2011 (FR) ...................................... 11 54996

(51) Int. Cl.
| F01D 25/16 | (2006.01) |
| F02C 7/28 | (2006.01) |
| F01D 25/18 | (2006.01) |
| F02C 7/06 | (2006.01) |
| F16C 27/04 | (2006.01) |
| F16C 19/26 | (2006.01) |

(52) U.S. Cl.
CPC ............... *F02C 7/28* (2013.01); *F01D 25/16* (2013.01); *F01D 25/18* (2013.01); *F01D 25/183* (2013.01); *F02C 7/06* (2013.01); *F16C 27/045* (2013.01); *F05D 2240/50* (2013.01); *F16C 19/26* (2013.01); *Y02T 50/671* (2013.01)

(58) Field of Classification Search
CPC .... F01D 25/164; F01D 25/166; F01D 25/183; F01D 25/186
See application file for complete search history.

(56) References Cited

U.S. PATENT DOCUMENTS 3,514,943 A * 6/1970 Britt ........................ F01D 25/18
                                                    184/6.4
4,046,430 A * 9/1977 Buono .................. F01D 25/164
                                                    384/99

(Continued)

FOREIGN PATENT DOCUMENTS

EP          1 564 397          8/2005

OTHER PUBLICATIONS

International Search Report Issued Oct. 1, 2012 in PCT/FR12/051261 Filed Jun. 6, 2012.

*Primary Examiner* — Gregory Anderson
*Assistant Examiner* — Michael Sehn
(74) *Attorney, Agent, or Firm* — Oblon, McClelland, Maier & Neustadt, L.L.P.

(57) ABSTRACT

A turbine engine including at least one shaft and at least one bearing for rotatably guiding the shaft about an axis of the turbine engine, the bearing including a first radially inner ring and a second radially outer ring enclosing rolling members, wherein the first ring is floatingly mounted on the shaft via a fluid damping film.

10 Claims, 4 Drawing Sheets

(56) References Cited

U.S. PATENT DOCUMENTS

| | | | | |
|---|---|---|---|---|
| 4,660,838 | A | * | 4/1987 | Katayama ............ F01D 25/186 |
| | | | | 277/422 |
| 5,593,165 | A | * | 1/1997 | Murray ................ F01D 11/003 |
| | | | | 277/543 |
| 7,488,112 | B2 | * | 2/2009 | Bouiller ................. F01D 25/16 |
| | | | | 384/543 |
| 2004/0062460 | A1 | * | 4/2004 | Dusserre-Telmon . F01D 25/164 |
| | | | | 384/475 |
| 2005/0198941 | A1 | | 9/2005 | Bart et al. |
| 2006/0233479 | A1 | | 10/2006 | Bouiller et al. |
| 2008/0190093 | A1 | | 8/2008 | Gauthier et al. |
| 2009/0297083 | A1 | * | 12/2009 | Raberin ................. F01D 25/16 |
| | | | | 384/537 |
| 2010/0111681 | A1 | | 5/2010 | Nakano et al. |

* cited by examiner

TURBINE ENGINE COMPRISING A FLOATING BEARING FOR GUIDING A SHAFT OF THE TURBINE ENGINE

BACKGROUND OF THE INVENTION

Field of the Invention

The present invention relates to the field of turbine engines and more particularly to a bearing for guiding a shaft of a turbine engine.

Description of the Related Art

The guide bearings used in a turbine engine comprise an inner ring and an outer ring enclosing rolling members, for example rollers. Conventionally, the outer ring is mounted in a connected manner on a stationary portion of the turbine engine and the inner ring is mounted in a connected manner on a shaft of the turbine engine, for example by means of press fitting. The bearing thus makes it possible to rotatably guide the shaft in relation to the stationary portion of the turbine engine.

In certain configurations, the bearing is mounted between two rotary shafts of the turbine engine. This type of bearing is commonly referred to as an "intershaft" bearing, a bearing of this type being known for example from the patent application FR 2 939 843 A1 by the company SNECMA.

Figure 1:
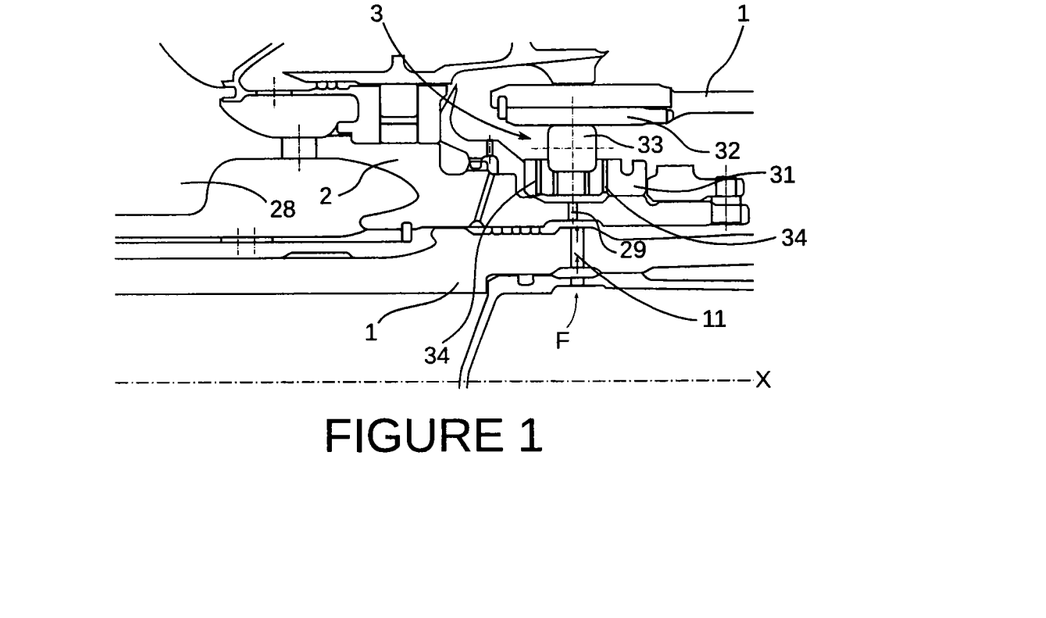
FIG. 1 is an axial sectional view of an aircraft turbojet engine according to the prior art.

By way of example, with reference to FIG. 1, a turbojet engine for an aircraft conventionally comprises a plurality of rotary turbine shafts, including a high-pressure shaft 2 which is rotatably mounted in relation to a low-pressure shaft 1 via an intershaft bearing 3 comprising rollers 33. The shafts are coaxial and extend along the axis X of the turbojet engine, the low-pressure shaft 1 being mounted inside the high-pressure shaft 2. The low-pressure shaft 1 comprises a downstream end which has a guide chute enveloping the downstream end of the high-pressure shaft 2 such that the bearing 3 is located in the chute between the outer surface of the high-pressure shaft 2 and the inner surface of the low-pressure shaft 1. In other words, the outer ring 32 of the intershaft bearing 3 is integral with a portion of the low-pressure shaft 1, whilst the inner ring 31 of the intershaft bearing 3 is integral with a portion of the high-pressure shaft 2, the rollers 33 of the bearing 3 being enclosed by the rings 31, 32 In this example, the inner ring 31 is press-fitted onto the high-pressure shaft 2 so as to prevent any translation and any rotation of the inner ring 31 of the bearing 3 in relation to the high-pressure shaft 2.

The turbojet engine moreover comprises means for supplying a flow of lubrication oil F for lubricating the guide bearing 3, which means are located inside the low-pressure shaft 1. In this example, the supply means are in the form of jets, but they may of course be in various forms. In order to lubricate the rollers 33 of the intershaft bearing 3, the inner ring 31 comprises radial channels 34 which make it possible to guide the lubrication oil F from the inner surface of the inner ring 31 to the outer surface thereof. Under the effect of the centrifugal forces, the flow of lubrication oil F successively passes through the wall of the low-pressure shaft 1 via a radial through-hole 11, the wall of the high-pressure shaft 2 via a radial through-hole 29 and lastly the inner ring 31 of the bearing 3 via radial through-channels 34 in order to reach the rollers 33 of the bearing 3.

With reference to FIG. 1, the high-pressure shaft 2 comprises, upstream thereof, solid turbine discs 28 which are sensitive, on the one hand, to the centrifugal forces as a result of the mass thereof, and, on the other hand, to the thermal expansion, as a result of the proximity thereof to the combustion chamber of the turbojet engine. Since the upstream portion of the high-pressure shaft 2 is in contact with the hot gases emanating from the combustion chamber and the downstream portion is cooled by a flow of lubrication oil, a thermal gradient, of approximately 200° C., appears between the upstream portion and the downstream portion of the high-pressure shaft 2.

Figure 2:
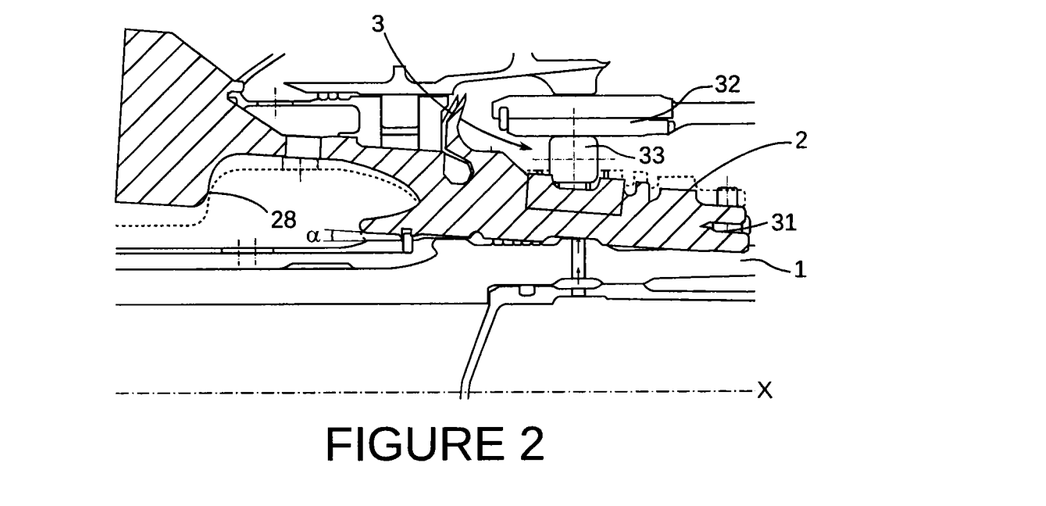
FIG. 2 is an axial sectional view of the turbojet engine in FIG. 1 during the conical shaping of the high-pressure shaft of the turbojet engine.

During the operation of the turbojet engine, the high-pressure shaft 2 deforms under the combined effects of the centrifugal forces and the thermal expansion. Conventionally, it is said that the high-pressure shaft 2 "becomes conical", given that the diameter of the upstream portion thereof increases whilst the downstream diameter thereof remains constant as shown in FIG. 2. In other words, the upstream portion of the high-pressure shaft 2 pivots radially by an angle $\alpha$ as shown in FIG. 2.

The conical shaping of the high-pressure shaft 2 leads to an orientation defect of the inner ring 31 of the bearing 3 which is mounted in a connected manner on the high-pressure shaft 2 as shown in FIG. 2. Since the inner 31 and outer 32 rings of the bearing 3 are no longer parallel, this results in mechanical stress at the rollers 33 of the bearing 3 and lubrication and cooling defects.

An immediate solution to eliminate this disadvantage would be to extend the upstream portion of the high-pressure shaft 2 in order to limit the pivoting thereof by the angle $\alpha$. This solution is however to be avoided, since it contradicts the evolutions of the turbojet engines which aim to reduce the mass of the turbojet engines as well as the size thereof.

BRIEF SUMMARY OF THE INVENTION

In order to eliminate at least some of these disadvantages, the invention proposes a turbine engine comprising a bearing which overcomes the orientation defects of the shaft on which it is mounted.

The invention relates to a turbine engine comprising at least one shaft and at least one bearing for rotatably guiding said shaft about an axis of the turbine engine, the bearing comprising a first radially inner ring and a second radially outer ring enclosing rolling members, wherein, in said turbine engine, the first ring is floatingly mounted on said shaft via a fluid damping film.

Advantageously, the fluid damping film makes it possible to damp the orientation defects of the shaft during the operation thereof. In other words, in addition to the functions thereof of lubricating and cooling the guide bearing, the fluid damping film makes it possible to offset and absorb the radial movements of the shaft during the operation thereof. The rings of the bearing thus remain parallel at all times, which allows optimal lubrication and cooling of said bearing. In addition, the fluid damping film makes it possible to thermally insulate the bearing of the shaft.

Preferably, the fluid damping film and the rolling members of the bearing belong to the same transverse plane defined in relation to the axis of the turbine engine.

Preferably, the turbine engine comprises upstream and downstream sealing means arranged to form a damping chamber delimited radially by the first ring and said shaft and longitudinally by the upstream and downstream sealing means. The damping chamber makes it possible to receive lubrication oil to form the fluid damping film between the first ring and the shaft.

More preferably, the upstream and/or downstream sealing means are in the form of at least one annular sealing segment. Still preferably, said shaft comprises at least one radial compartment arranged to house the upstream and/or downstream sealing means. This makes it possible to mount the bearing on the shaft by displacing the sealing means in the compartments of the shaft. When the compartment is filled with lubrication oil, the pressure that it generates presses the sealing means on the outer edges of the respective compartments thereof, whilst the centrifugal force presses them against the inner ring of the bearing which seals the damping chamber and forces the oil to progress towards escape sections arranged in the sealing means, in general by a calibrated play between the ends of each segment.

Preferably, since the first, inner ring comprises an outer surface turned towards the rolling members of the bearing and an inner surface opposite the outer surface, the inner surface of the first, inner ring comprises at least one annular groove and, preferably, a downstream annular groove and an upstream annular groove. A groove advantageously makes it possible to collect the lubrication oil on the inner surface of the first, inner ring to allow the introduction thereof into the channels of the first ring.

Preferably, since the inner surface of the first, inner ring comprises at least an upstream annular groove and a downstream annular groove, the inner surface of the first, inner ring which extends between the upstream and downstream annular grooves is solid. In other words, the inner surface of the first, inner ring is devoid of holes between the downstream and upstream ends thereof to form the outer wall of a damping chamber under the bearing.

According to one aspect of the invention, the first, inner ring comprises at least one internal longitudinal channel extending in the first ring, first channels connecting the longitudinal channel to the inner surface of the first, inner ring and second channels connecting the longitudinal channel to the outer surface of the first, inner ring. An internal channel advantageously makes it possible to conduct the oil collected at the inner surface of the inner ring and to distribute it at the outer surface while allowing the formation of a damping chamber under the bearing.

Preferably, the first channels discharge into at least one of the annular grooves. Thus, the oil collected by the annular groove is conveyed to the internal channel in order to lubricate and cool the bearing. Moreover, the second channels discharge at the rolling members of the bearing, preferably upstream and downstream of said rolling members.

According to another aspect of the invention, the first, inner ring comprises at least connecting channels extending diagonally in relation to a transverse plane defined in relation to the axis of the turbine engine, the connecting channels connecting the inner surface of the first, inner ring to the outer surface thereof. This advantageously makes it possible to distribute the lubrication oil at the outer surface of the inner ring while allowing the formation of a damping chamber under the bearing.

Preferably, the first ring comprises means for connecting the inner ring and said shaft in rotation, preferably pins or slots. Thus, the reliability of the assembly is improved while allowing radial play between the bearing and the shaft in order to damp any orientation defect of the shaft.

According to a preferred aspect, since the shaft comprises a main annular trough formed radially in the inner surface of the shaft and an auxiliary annular trough formed radially in the inner surface of the main trough, the shaft comprises:
- holes for supplying the fluid damping film which connect the auxiliary trough to the outer surface of the shaft, and
- holes for lubricating the bearing which connect the main trough to the outer surface of the shaft.

Advantageously, the lubrication oil is first supplied to the damping fluid to ensure the operation thereof, then to the channels of the bearing for the lubrication thereof.

Preferably, since the turbine engine comprises a low-pressure turbine shaft and a high-pressure turbine shaft, the first ring is an inner bearing ring mounted on the high-pressure turbine shaft.

The invention also relates to a method for supplying oil to a turbine engine comprising at least one shaft and at least one bearing for rotatably guiding said shaft about an axis of the turbine engine, the bearing comprising a first radially inner ring and a second radially outer ring enclosing rolling members, the first ring being mounted outside said shaft and comprising channels for lubricating the rolling members, a damping chamber being defined between the first ring and said shaft, wherein, in said method, when the turbine engine is switched on:
- a flow of lubrication oil is supplied to the damping chamber in order to form a fluid damping film between the first ring and the shaft, then
- a flow of lubrication oil is supplied to the channels for lubricating the rolling members.

Advantageously, the supply of oil to the bearing is sequential in order to ensure as a priority the operation of the damping fluid before lubricating the rolling members.

BRIEF DESCRIPTION OF THE SEVERAL VIEWS OF THE DRAWINGS

The invention will be better understood and other details, advantages and features of the invention will become apparent by reading the following description given by way of non-limiting example, with reference to the appended drawings, in which.

DETAILED DESCRIPTION OF THE INVENTION

The invention will be set out below for a turbojet engine, but it applies to any turbine engine, both for the propulsion of an aircraft and for producing electricity.

Figure 3:
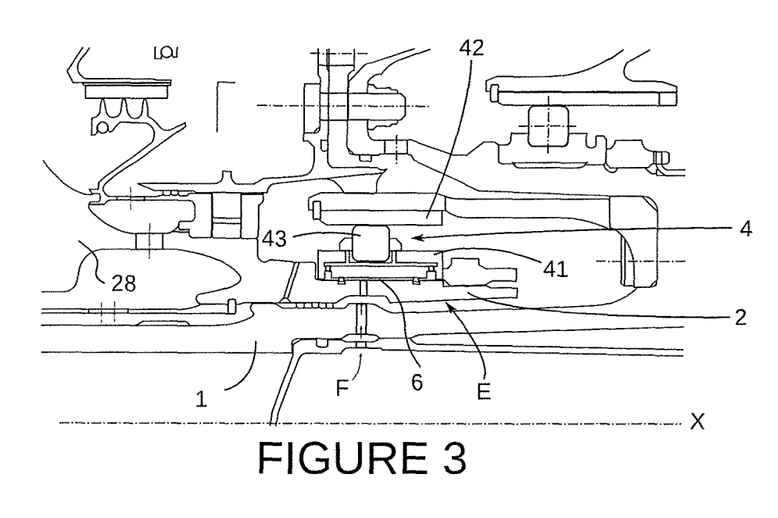
FIG. 3 is an axial sectional view of an aircraft turbojet engine according to the invention.

With reference to FIG. 3, in a similar manner to a turbojet engine according to the prior art as shown in FIG. 1, a turbojet engine according to the invention comprises a first low-pressure shaft 1 and a second high-pressure shaft 2 which are coaxial with each other and extend along the axis X of the turbojet engine. The low-pressure 1 and high-pressure 2 shafts are rotatably mounted in relation to each other and are separated by a lubrication space E, known by a person skilled in the art as a "gap", the low-pressure shaft 1 being mounted in the high-pressure shaft 2.

The turbojet engine further comprises a bearing 4 for guiding said low-pressure 1 and high-pressure 2 shafts which comprises a first, inner ring 41 and a second, outer ring 42 enclosing rolling members, in this case, rollers 43. As shown in FIG. 3, the bearing 4 is mounted outside the high-pressure shaft 2. For this purpose, the downstream end of the low-pressure shaft 1 comprises an annular chute enveloping the downstream end of the high-pressure shaft 2 such that the guide bearing 4 is located inside the low-pressure shaft 1 and outside the high-pressure shaft 2. In other words, the outer ring 42 of the bearing 4 is integral with a portion of the low-pressure shaft 1 whilst the inner ring 41 of the bearing 4 is integral with a portion of the high-pressure shaft 2 which is conventionally referred to as a "high-pressure journal" by a person skilled in the art.

Figure 4:
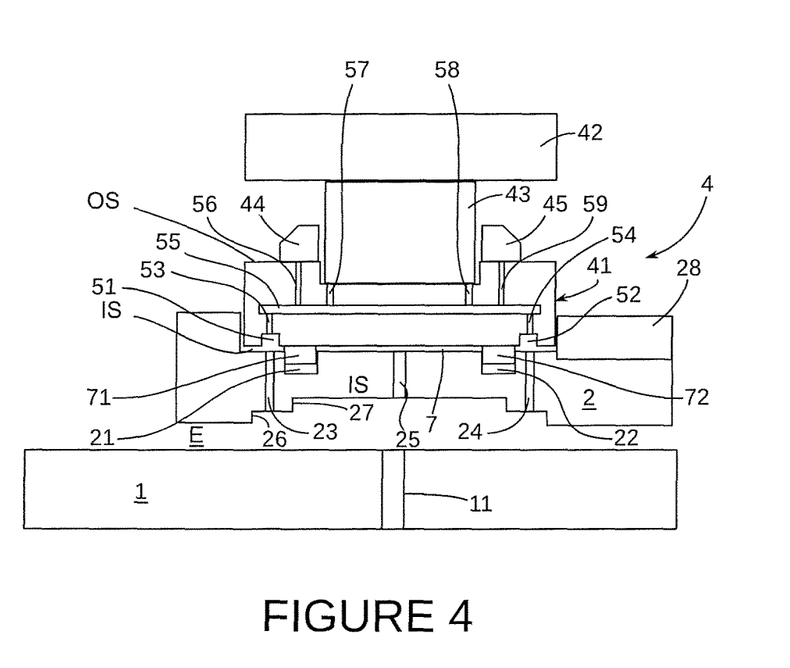
FIG. 4 is an enlarged axial sectional view of the bearing of the turbojet engine in FIG. 3.

With reference to FIG. 4, which shows the bearing 4 in detail, the inner ring 41 of the bearing 4 comprises channels 51-59 which make it possible to transport lubrication oil from the inner surface IS of the inner ring 41 towards the outer surface OS thereof. Similarly to the turbojet engine in FIG. 1, the turbojet engine according to the invention comprises means for supplying a flow of lubrication oil F in order to lubricate the guide bearing 4. In this example, the supply means are in the form of jets, but they may of course be in various forms.

The means for supplying the flow of lubrication oil F are arranged inside the low-pressure shaft 1. Thus, in order to lubricate the guide bearing 4, the flow of lubrication oil F must successively pass through the low-pressure shaft 1, the lubrication space E and the high-pressure shaft 2. For this purpose, as shown in FIG. 4, the low-pressure shaft 1 comprises radial distribution through-holes 11 arranged to distribute the flow of lubrication oil F from the supply means to the lubrication space E. Similarly, the high-pressure shaft 2 comprises radial distribution through-holes 23-25 arranged to distribute the flow of lubrication oil F in the channels 51-59 of the inner ring 41 of the bearing 4 and thus to lubricate the rollers 43 and the cages 44-45 of the bearing 4.

According to the invention, the inner ring 41 of the bearing 4 is floatingly mounted on the high-pressure shaft 2 via a fluid damping film 6 such that the inner 41 and outer 42 rings of the bearing 4 remain parallel during operation of the turbojet engine. The fluid damping film 6 thus makes it possible to offset the orientation defects of the high-pressure shaft, for example when said shaft deforms and "becomes conical".

As shown in detail in FIG. 4, the bearing 4 comprises an outer ring 42 integral with the low-pressure shaft 1 and an inner ring 41 mounted on the high-pressure shaft 2, the rings 41, 42 enclosing rollers 43 which are locked longitudinally by shoulders of the inner ring and angularly by an upstream angular cage 44 and a downstream annular cage 45 which are mounted on the outer surface of the inner ring 41.

A damping chamber 7 is defined between the inner ring 41 of the bearing 4 and the high-pressure shaft 2 to receive lubrication oil and form a fluid damping film 6 interposed between the bearing 4 and the high-pressure shaft 2. More precisely, the damping chamber 7 is delimited radially by the inner surface IS of the inner ring 41 on the one hand, and the outer surface of the high-pressure shaft 2 on the other hand.

The turbojet engine further comprises upstream 71 and downstream 72 sealing means in the form of annular sealing segments 71, 72, extending radially, which are distinct from the inner ring 41 of the bearing 4 and the high-pressure shaft 2. As shown in FIG. 4, the annular sealing segments 71, 72 make it possible to longitudinally delimit the damping chamber 7 and thus sealingly confine the lubrication oil of the fluid damping film 6. The sealing segments 71, 72 make it possible to improve the operation but are not necessary for the operation of the bearing 4.

In this example, each annular sealing segment 71, 72 comprises an escape section calibrated so as to allow the lubrication oil to exit the damping chamber 7. Each annular sealing segment 71, 72 comprises, in this example, a radial gap (not shown) extending over an angular range of approximately 1° between the two ends of the segment 71, 72. Thus, during operation, the lubrication oil of the damping film 6 is renewed in the damping chamber 7, the flow of oil F entering the damping chamber 7 via a through-hole 25 of the high-pressure shaft 2 and escaping via the radial gaps of the segments 71, 72.

Still with reference to FIG. 4, the high-pressure shaft 2 comprises at least two radial compartments 21, 22 formed in the outer surface of the high-pressure shaft 2 and arranged to house the annular sealing segments 71, 72 respectively. Thus, the annular sealing segments 71, 72 are capable of moving radially in the compartments 71, 72 thereof to allow the inner ring 41 of the bearing 4 to be mounted on the high-pressure shaft 2. During operation, the annular sealing segments 71, 72 are pressed against the inner surface IS of the inner ring 41 under the effect of the centrifugal forces in order to delimit the damping chamber 7.

As shown in FIG. 4, each sealing segment 71, 72 has a substantially rectangular axial cross section and can thus move in the compartment 21, 22 thereof, the axial cross section of which is also rectangular. Each sealing segment 71, 72 is thus free to enter into rotation along the axis X of the turbine engine in the compartment 21, 22 thereof. The resistive torques linked to the friction between the annular sealing segments 71, 72 and the high-pressure shaft 2 on the one hand and the inner surface of the inner ring 41 on the other hand are greater than the rolling friction of the rollers 43. This can advantageously make it possible not to have to resort to an anti-rotation device between the inner ring 41 and the high-pressure shaft 2.

As indicated previously, the inner ring 41 of the bearing 4 further comprises channels 51-59 for supplying oil which connect the inner surface IS of the inner ring 41 to the outer surface OS thereof to lubricate and cool the rollers 43 of the bearing 4. Given that the fluid damping film 6 is radially aligned with the roller 43 of the bearing 4 in order to optimise damping, it is no longer possible to form radial channels which are radially aligned with the roller 43 in the inner ring 41 as was carried out for the bearings in the prior art.

According to the invention, the inner ring 41 comprises, between the upstream and downstream ends thereof, a central portion of which the inner surface IS is solid and continuous, that is to say devoid of holes, in order to form a radially outer wall of the damping chamber 7.

In order to nevertheless allow the lubrication oil F to be transported through the inner ring 41, with reference to FIG. 4, said inner ring comprises at least:
- an upstream annular groove 51 and a downstream annular groove 52 formed in the inner surface IS of the inner ring 41,
- an internal longitudinal channel 55, a first upstream radial channel 53 connecting the upstream annular groove 51 to the internal longitudinal channel 55, a first downstream radial channel 54 connecting the downstream annular groove 52 to the internal longitudinal channel 55, a second upstream radial channel for lubricating the cage 56 connecting the internal longitudinal channel 55 to the outer surface OS of the inner ring 41 located under the upstream cage 44, a second upstream radial channel for lubricating the roller 57 connecting the internal longitudinal channel 55 to the outer surface OS of the inner ring 41 located under an upstream portion of the roller 43, a second downstream radial channel for lubricating the roller 58 connecting the internal longitudinal channel 55 to the outer surface OS of the inner ring 41 located under a downstream portion of the roller 43, and a second downstream radial channel for lubricating the cage 59 connecting the internal longitudinal channel 55 to the outer surface OS of the inner ring 41 located under the downstream cage 45.

Channels 51-59 of this type make it possible to collect the flow of oil F at the lateral ends of the inner surface IS of the inner ring 41 and to distribute it on the outer surface OS to lubricate the cages 44, 45 and the rollers 43.

In order to supply the damping chamber 7 on the one hand and the channels 51-59 of the inner ring 41 on the other hand, the high-pressure shaft 2 comprises upstream radial through-holes 23 aligned with the upstream annular groove 51 of the inner ring 41, downstream radial through-holes 24 aligned with the downstream annular groove 52 of the inner ring 41 and central radial through-holes 25 discharging into the damping chamber 7.

The high-pressure shaft 2 further comprises a main annular trough 26 and an auxiliary annular trough 27 radially hollowed out in the inner surface of the high-pressure shaft 2. As shown in FIG. 4, the auxiliary trough 27 is hollowed out in the main trough 26 in order to form several levels and to allow a sequential supply of the through-holes 23-25 of the high-pressure shaft 2 when the turbojet engine is put into operation as described below. The main trough 26 has a longitudinal dimension which is greater than the auxiliary trough 27. Thus, the central through-holes 25 discharge into the auxiliary trough 27 whilst the upstream 23 and downstream through-holes 24 discharge into the main trough 26.

Figure 5A:
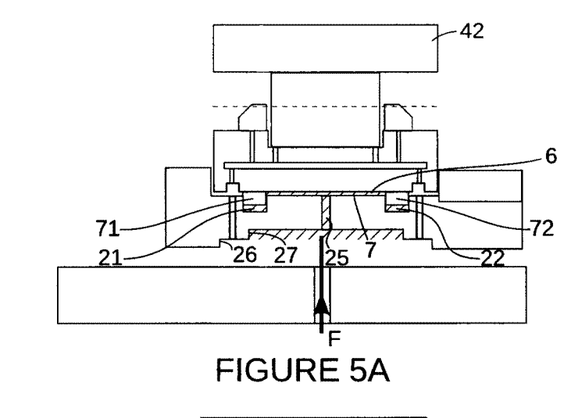
FIG. 5A shows a first stage of supplying lubrication oil to the bearing in FIG. 4.
Figure 5B:
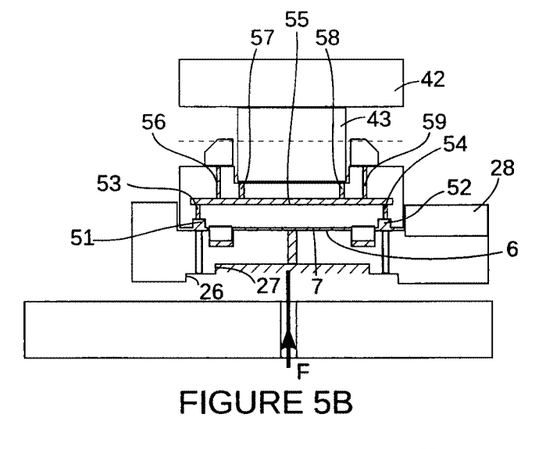
FIG. 5B shows a second stage of supplying lubrication oil to the bearing in FIG. 4.
Figure 5C:
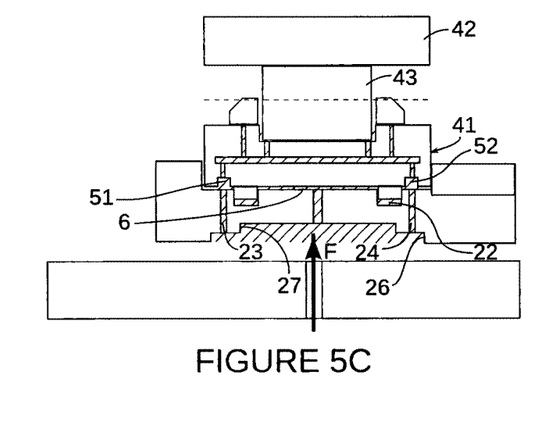
FIG. 5C shows a third stage of supplying lubrication oil to the bearing in FIG. 4.

A method for supplying lubrication oil F to a bearing 4 of a turbojet engine according to the invention will now be set out with reference to FIG. 5A-5C.

With reference to FIG. 5A showing a first stage of supplying oil, the lubrication oil F (shown by hatched lines in FIG. 5A-5C) accumulates in the annular auxiliary trough 27 under the effect of the centrifugal forces and flows through the central through-hole 25 of the high-pressure shaft 2 to fill the damping chamber 7. The flow of lubrication oil F exerts a pressure on the upstream 71 and downstream 72 annular sealing segments which are pushed upstream and downstream respectively. As shown in FIG. 5A, the lubrication oil F fills the compartments 21, 22 of the sealing segments 71, 72 formed in the outer surface of the high-pressure shaft 2. The damping chamber 7 is thus filled with lubrication oil F under pressure in order to form a fluid damping film 6 between the high-pressure shaft 2 and the bearing 4. Following this first stage of supplying oil, the fluid damping film 6 is operational.

With reference to FIG. 5B showing a second stage of supplying oil, as lubrication oil is supplied, the lubrication oil escapes from the damping chamber 7 from the calibrated escape section of the sealing segments 71, 72. Under the effect of the centrifugal forces, the lubrication oil F emanating from the damping chamber 7 enters the annular grooves 51, 52 of the inner ring 41 to be collected and then conducted into the second lubrication channels 56-59 via the first radial channels 53-54 and the internal longitudinal channel 55. Following this second stage of supplying oil, the channels 51-59 of the inner ring 41 are filled with lubrication oil but the flow remains weak because it corresponds to the flow escaping the damping chamber 7. This stage makes it possible to begin lubricating the bearing 4.

With reference to FIG. 5C showing a third stage of supplying oil, the lubrication oil overflows out of the auxiliary trough 27 to accumulate in the main trough 26, which makes it possible for the lubrication oil F to be supplied directly to the annular grooves 51, 52 of the inner ring 41 through the upstream 23 and downstream 24 through-holes of the high-pressure shaft 2. The flow of oil emanating from the upstream 23 and downstream 24 through-holes of the high-pressure shaft 2 make it possible to supply the channels 51-59 of the inner ring 41 in order to cool and lubricate the bearing 4 in an optimal manner.

Figure 6:
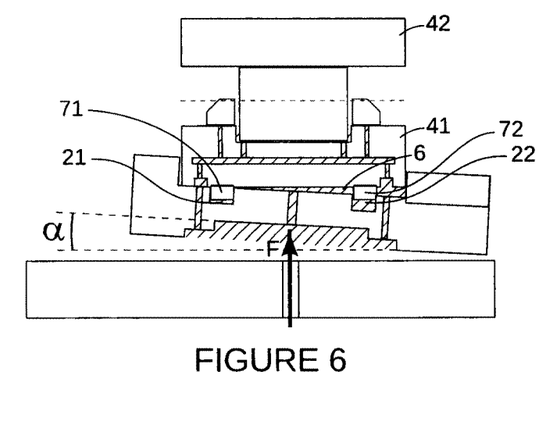
FIG. 6 is an axial sectional view of the bearing of the turbojet engine in FIG. 4 during the conical shaping of the high-pressure shaft of the turbojet engine.

Now with reference to FIG. 6, during the operation of the turbojet engine, the high-pressure shaft 2 deforms and "becomes conical" under the combined effects of the centrifugal forces and the thermal expansion, the upstream portion of the high-pressure shaft 2 displacing radially towards the outside and forming an angle α with the axis X of the turbojet engine. Due to the presence of the fluid damping film 6, there is play between the inner ring 41 of the bearing 4 and the high-pressure shaft 2. As a result of this play, the deformation of the high-pressure shaft 2 is offset by the fluid damping film 6, the orientation of the inner ring 41 of the bearing 4 not being modified, as shown in FIG. 6. Since the parallelism between the inner 41 and outer 42 rings of the bearing 4 is preserved, the lubrication of the bearing 4 by the flow of lubrication oil F remains optimal.

Figure 7:
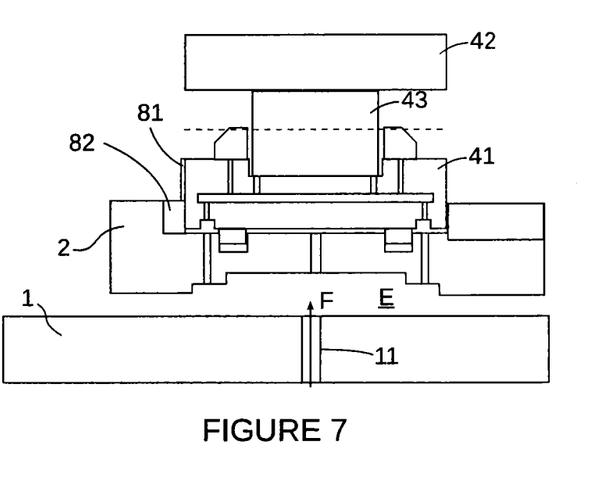
FIG. 7 is an axial sectional view of a first variant of a bearing of a turbojet engine according to the invention.

Preferably, the inner ring 41 of the bearing 4 comprises means for connecting the inner ring 41 and the high-pressure shaft 2 in rotation, which makes it possible to make the assembly more secure while allowing radial play between the inner ring 41 and the high-pressure shaft 2 in order to offset the deformation of the high-pressure shaft 2. Preferably, the connection means are in the form of pins or slots 81 cooperating with slots 82 of the high-pressure shaft 2 as shown in FIG. 7.

The invention was previously set out for an inner ring 41 of a bearing 4 comprising an assembly of radial channels 53-54, 56-59 and an internal longitudinal channel 55. Alternatively, when the radial thickness of the inner ring 41 of the bearing 4 is insufficient for forming an internal longitudinal channel 55, the inner ring 41 can comprise diagonal channels 91-94 as shown in FIG. 8.

This variant of the invention is described with reference to FIG. 8. The reference signs used to describe the elements with an identical, equivalent or similar structure or function to those of the elements of FIG. 4 are the same, in order to simplify the description. Moreover, not all of the description of the inner ring in FIG. 4 is reproduced, this description applying to the elements of FIG. 8 when these are consistent. Only the significant structural and functional differences are described.

Figure 8:
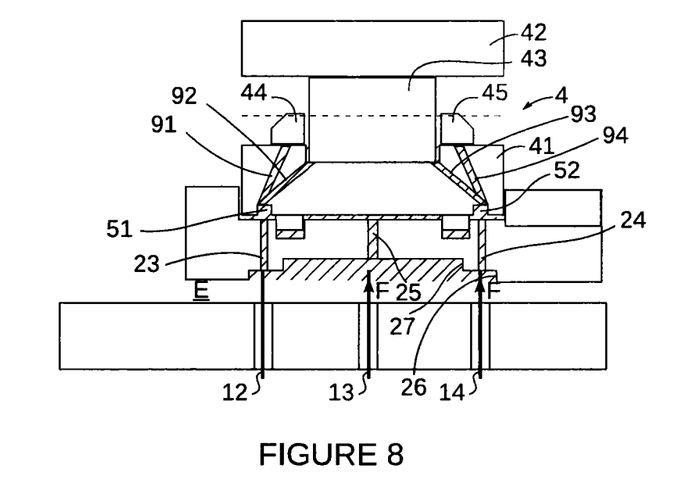
FIG. 8 is an axial sectional view of a second variant of a bearing of a turbojet engine according to the invention.

Thus, with reference to FIG. 8, the inner ring 41 comprises:

an upstream annular groove 51 and a downstream annular groove 52 formed in the inner surface IS of the inner ring 41, a first upstream diagonal channel 91 connecting the upstream annular groove 51 to the outer surface OS of the inner ring 41 located under the upstream cage 44, a second upstream diagonal channel 92 connecting the upstream annular groove 51 to the outer surface OS of the inner ring 41 located under an upstream portion of the roller 43, a first downstream diagonal channel 93 connecting the downstream annular groove 52 to the outer surface OS of the inner ring 41 located under a downstream portion of the roller 43, and a second downstream diagonal channel 94 connecting the downstream annular groove 52 to the outer surface OS of the inner ring 41 located under the downstream cage 45.

A low-pressure shaft 1 was previously set out comprising through-holes 11 distributed in a single plane transverse to the axis X of the turbojet engine. The low-pressure shaft 1 can of course comprise through-holes 12, 13, 14 distributed along several longitudinally offset transverse planes (for example three as shown in FIG. 8) so as to better distribute the lubrication oil F into the through-holes 23, 24, 25 of the high-pressure shaft 2.

The invention claimed is:

1. A turbine engine comprising:
  a shaft;
  a bearing for rotatably guiding the shaft about an axis of the turbine engine, the bearing comprising a first, radially inner ring and a second, radially outer ring enclosing a rolling member, wherein the first ring is floatingly mounted on the shaft via a fluid damping film so as to damp orientation defects of the shaft during operation thereof; and
  upstream and downstream sealing segments configured to form a damping chamber which is delimited radially by the first ring and the shaft and longitudinally by the upstream and downstream sealing segments, the damping chamber containing the fluid damping film,
  wherein the shaft comprises a main annular trough formed radially in an inner surface of the shaft, an auxiliary annular trough formed radially in an inner surface of the main annular trough, a first hole which connects the auxiliary trough to an outer surface of the shaft, and a second hole which connects the main trough to the outer surface of the shaft,
  wherein the first ring comprises an upstream annular groove and a downstream annular groove, and
  wherein the auxiliary annular trough is in fluid communication with the damping chamber via the first hole, and the main annular trough is in fluid communication with one of the upstream and downstream annular grooves via the second hole.

2. A turbine engine according to claim 1, wherein the shaft comprises an upstream annular compartment which houses the upstream sealing segment, and a downstream annular compartment which houses the downstream sealing segment.

3. A turbine engine according to claim 2, wherein the first ring comprises an outer surface turned towards a rolling member of the bearing and an inner surface opposite the outer surface, the inner surface of the first ring comprises the upstream annular groove and the downstream annular groove, and the inner surface of the first ring extends between the upstream and downstream annular grooves and is solid, the upstream groove of the first ring is further upstream than the upstream annular compartment housing the upstream sealing segment, and the downstream groove of the first ring is further downstream of the downstream annular compartment housing the downstream sealing segment.

4. A turbine engine according to claim 3, wherein the first ring comprises:
  at least one internal longitudinal channel extending in the first ring,
  first channels connecting the longitudinal channel to the inner surface of the first ring, and
  second channels connecting the longitudinal channel to the outer surface of the first ring.

5. A turbine engine according to claim 4, wherein the first channels discharge into at least one of the upstream and downstream annular grooves.

6. A turbine engine according to claim 3, wherein the first ring comprises at least connecting channels extending diagonally in relation to a transverse plane defined in relation to the axis of the turbine engine, the connecting channels connecting the inner surface of the first ring to the outer surface thereof.

7. A turbine engine according to claim 1, wherein, the turbine engine comprises a low-pressure turbine shaft and a high-pressure turbine shaft, the first ring is an inner ring of an intershaft bearing mounted on the high-pressure turbine shaft.

8. A turbine engine according to claim 1, wherein the shaft comprises:
  at least one upstream radial through-holes aligned with the upstream annular groove of the first ring,
  at least one downstream radial through-holes aligned with the downstream annular groove, and
  at least one central radial through-holes discharging into the damping chamber in order to supply channels of the first ring, to distribute a flow of lubrication oil on an outer surface of the first ring to lubricate cages and rolling members, and to supply the damping chamber.

9. A method for supplying lubrication oil to a turbine engine including a shaft, a bearing for rotatably guiding the shaft about an axis of the turbine engine, the bearing including a first, radially inner ring and a second, radially outer ring enclosing a rolling member, the first ring being mounted outside the shaft and including channels for lubricating the rolling member, a damping chamber being defined radially between the first ring and the shaft and longitudinally by upstream and downstream sealing segments,
  the shaft comprises a main annular trough formed radially in an inner surface of the shaft, an auxiliary annular trough formed radially in an inner surface of the main trough, a first hole which connects the auxiliary trough to an outer surface of the shaft, and a second hole which connects the main trough to the outer surface of the shaft, the first ring comprises an upstream annular groove and a downstream annular groove, and the auxiliary annular trough is in fluid communication with the damping chamber via the first hole, and the main annular trough is in fluid communication with one of the upstream and downstream annular grooves via the second hole,
  the method, when the turbine engine is switched on, comprising:
  supplying a flow of lubrication oil to the damping chamber via the first hole to form a fluid damping film between the first ring and the shaft; then supplying the flow of lubrication oil to the lubrication channels of the rolling member.

10. A turbine engine comprising:

a shaft;

a bearing for rotatably guiding the shaft about an axis of the turbine engine, the bearing comprising a first, radially inner ring and a second, radially outer ring enclosing a rolling member, wherein the first ring is floatingly mounted on the shaft via a fluid damping film so as to damp orientation defects of the shaft during operation thereof; and upstream and downstream sealing segments configured to form a damping chamber which is delimited radially by the first ring and the shaft and longitudinally by the upstream and downstream sealing segments, the damping chamber containing the fluid damping film, wherein the shaft comprises an upstream annular compartment which houses the upstream sealing segment, and a downstream annular compartment which houses the downstream sealing segment, and wherein, the first ring comprises an outer surface turned towards the rolling member of the bearing and an inner surface opposite the outer surface, the inner surface of the first ring comprises an upstream annular groove and a downstream annular groove, and the inner surface of the first ring extends between the upstream and downstream annular grooves and is solid, the upstream groove of the first ring is further upstream than the upstream annular compartment housing the upstream sealing segment, and the downstream groove of the first ring is further downstream of the downstream annular compartment housing the downstream sealing segment.

* * * * *